(12) United States Patent
Gray et al.

(10) Patent No.: US 7,950,579 B2
(45) Date of Patent: *May 31, 2011

(54) SYSTEM AND METHOD FOR EVALUATING INVENTORY

(75) Inventors: Jeffrey Scott Gray, Florence, KY (US); James Todd Shofner, Florence, KY (US)

(73) Assignee: The Kroger Co., Cincinnati, OH (US)

( * ) Notice: Subject to any disclaimer, the term of this patent is extended or adjusted under 35 U.S.C. 154(b) by 688 days.

This patent is subject to a terminal disclaimer.

(21) Appl. No.: 11/216,883

(22) Filed: Aug. 31, 2005

(65) Prior Publication Data
US 2006/0169775 A1 Aug. 3, 2006

Related U.S. Application Data

(63) Continuation-in-part of application No. 11/047,451, filed on Jan. 31, 2005.

(51) Int. Cl.
*G06F 19/00* (2006.01)
(52) U.S. Cl. .......................... 235/385; 235/375; 235/376
(58) Field of Classification Search .................. 235/375, 235/376, 378, 385
See application file for complete search history.

(56) References Cited

U.S. PATENT DOCUMENTS

| | | | | |
|---|---|---|---|---|
| 4,563,739 A | * | 1/1986 | Gerpheide et al. | 705/28 |
| 4,680,703 A | * | 7/1987 | Kriz | 711/112 |
| 5,237,498 A | * | 8/1993 | Tenma et al. | 705/30 |
| 5,596,493 A | * | 1/1997 | Tone et al. | 705/10 |
| 6,616,037 B2 | * | 9/2003 | Grimm et al. | 235/385 |
| 2001/0047293 A1 | * | 11/2001 | Waller et al. | 705/10 |
| 2003/0093313 A1 | | 5/2003 | Kiefer | |
| 2004/0107141 A1 | * | 6/2004 | Conkel et al. | 705/15 |
| 2004/0153381 A1 | * | 8/2004 | Smith | 705/30 |

FOREIGN PATENT DOCUMENTS

| | | |
|---|---|---|
| JP | 11144152 | 5/1999 |
| JP | 2001350827 | 12/2001 |
| JP | 2002083108 | 3/2002 |
| JP | 2002236792 | 8/2002 |
| JP | 2002259524 | 9/2002 |
| JP | 2003036293 | 2/2003 |
| JP | 2003168170 | 6/2003 |
| JP | 2003242220 | 8/2003 |
| JP | 2004078339 | 3/2004 |
| JP | 2004118710 | 4/2004 |

* cited by examiner

*Primary Examiner* — Daniel A Hess
*Assistant Examiner* — Paultep Savusdiphol
(74) *Attorney, Agent, or Firm* — Pillsbury Winthrop Shaw Pittman LLP

(57) ABSTRACT

A computer assisted method for evaluating inventory is provided. The method includes receiving case composition information and case cost information for a case at a store where the case composition information identifies an item of the case and the case cost information identifies cost of the case. An item cost of the item is calculated using the case composition information and case cost information and the item cost is stored in memory. Consumer code information is received for the item and the item cost of the item is retrieved. Inventory cost data is generated using the item cost.

22 Claims, 5 Drawing Sheets

| File | Edit | View | Options | Help |
|---|---|---|---|---|

PTSC     PID     WEIGHT/COST YIELD INFORMATION     10/17
TRX: PTSC     MEN: PID     KEY: 796
ACT     (QC,F,B,R,X,L,/t)

SRC ID: 796     CASE UPC: 04004     DIV: 700     RTL EXT FTR: 62.4
    LST BIL AMT: 85.16
    LOSS % : 0.30

| A | CONSUMER UPC | TP | ABBR DESC | LBS | YIELD % | COST | COST/LB |
|---|---|---|---|---|---|---|---|
| | 02001106 | P | KSBCHKRST | 8.892 | 14.25 | 12.182 | 1.37 |
| | 02001115 | P | BF CHK | 8.892 | 14.25 | 12.182 | 1.37 |
| | 02001116 | P | BF CHK | 8.885 | 14.24 | 12.172 | 1.37 |
| | 02001117 | P | BEEF ROAST | 8.885 | 14.24 | 12.172 | 1.37 |
| | 02001118 | P | BF CHK | 8.885 | 14.24 | 12.172 | 1.37 |
| | 02001119 | P | BF CHK | 8.885 | 14.24 | 12.172 | 1.37 |
| | 02001122 | P | BF CHKNCKBN | 8.885 | 14.24 | 12.172 | 1.37 |

CONNECTED TO HOST

SYSTEM AND METHOD FOR EVALUATING INVENTORY

CROSS-REFERENCE TO RELATED APPLICATIONS

This application is a continuation-in-part application of and claims priority to U.S. application Ser. No. 11/047,451, filed on Jan. 31, 2005.

FIELD OF INVENTION

The present application relates to a system and method for retail outlets to evaluate inventory.

BACKGROUND OF THE INVENTION

A number of systems and accounting methods have been developed to evaluate inventory of retail outlets or stores. Inventory can be a primary cost of a retail enterprise and it can be important to evaluate cost of on-hand inventory for purposes of inventory management.

Traditional retail inventory evaluation methods include comparing items received by a store to items sold by the store. The difference between the items received by the store and items sold by the store can give an indication of the number of items in inventory. Additionally, physical inventory may be taken, for example, by a store employee identifying inventory items. In this instance, the employee takes an accounting of items in inventory to provide an indication of inventory numbers. With the item costs, an inventory cost can be associated with the inventory calculated or identified.

A method for tracking the location or identity of items in inventory is through use of Universal Product Code technology, or barcode technology, which uses a linear array of elements that are either printed directly on an object or on labels that are affixed to the object. These bar code elements typically comprise bars and spaces, with bars of varying widths representing strings of binary ones and spaces of varying widths representing strings of binary zeros. Bar codes can be detectable optically using devices such as scanning laser beams or handheld wands, or they can be implemented in magnetic media. The readers and scanning systems electro-optically decode the symbol to multiple alpha-numerical characters that are intended to be descriptive of the article or some characteristic thereof. Such characters are typically represented in digital form as an input to a data processing system for applications in point-of-sale processing and inventory control.

BRIEF SUMMARY OF THE INVENTION

In an aspect, a computer assisted method for evaluating inventory is provided. The method includes receiving case composition information and case cost information for a case at a store where the case composition information identifies an item of the case and the case cost information identifies cost of the case. An item cost of the item is calculated using the case composition information and case cost information and the item cost is stored in memory. Consumer code information is received for the item and the item cost of the item is retrieved. Inventory cost data is generated using the item cost.

In another aspect, a method for evaluating inventory is provided. The method includes receiving cases at a store, where each case includes one or more components capable of being used to produce a variable number or types of items. Case code information is received identifying the nature of components in the cases and case cost information. Case composition information is retrieved for the received cases from a database using the case code information, where the case composition information identifies one or more types of items capable of being produced using the components of the cases. An item cost is calculated for each of the one or more types of items capable of being produced using the components of the cases where the step of calculating uses the case composition information and the case cost information. The item cost is stored in a cost database. Multiple items are identified in inventory and item code information is received for the identified items. The item cost of the identified items is retrieved from the cost database and the item cost is associated with the identified items. An inventory report is generated using the associated item cost.

In another aspect, a system for managing financial data includes an enterprise mainframe and one or more store workstations. The enterprise mainframe is programmed to perform the steps of receiving case composition information and case cost information for a case at a store where the case composition information identifies an item of the case and the case cost information identifies cost of the case. The enterprise mainframe calculates an item cost of the item using the case composition information and case cost information and stores the item cost in memory. Item code information is received for the item in inventory. The average item cost of the item is retrieved and is used to generate inventory cost data. The inventory cost data is transmitted to the one or more workstations.

BRIEF DESCRIPTION OF THE SEVERAL VIEWS OF THE DRAWING

FIG. 2 is an embodiment of a screenshot of a cut-down case example;

DETAILED DESCRIPTION OF THE INVENTION

Figure 1:
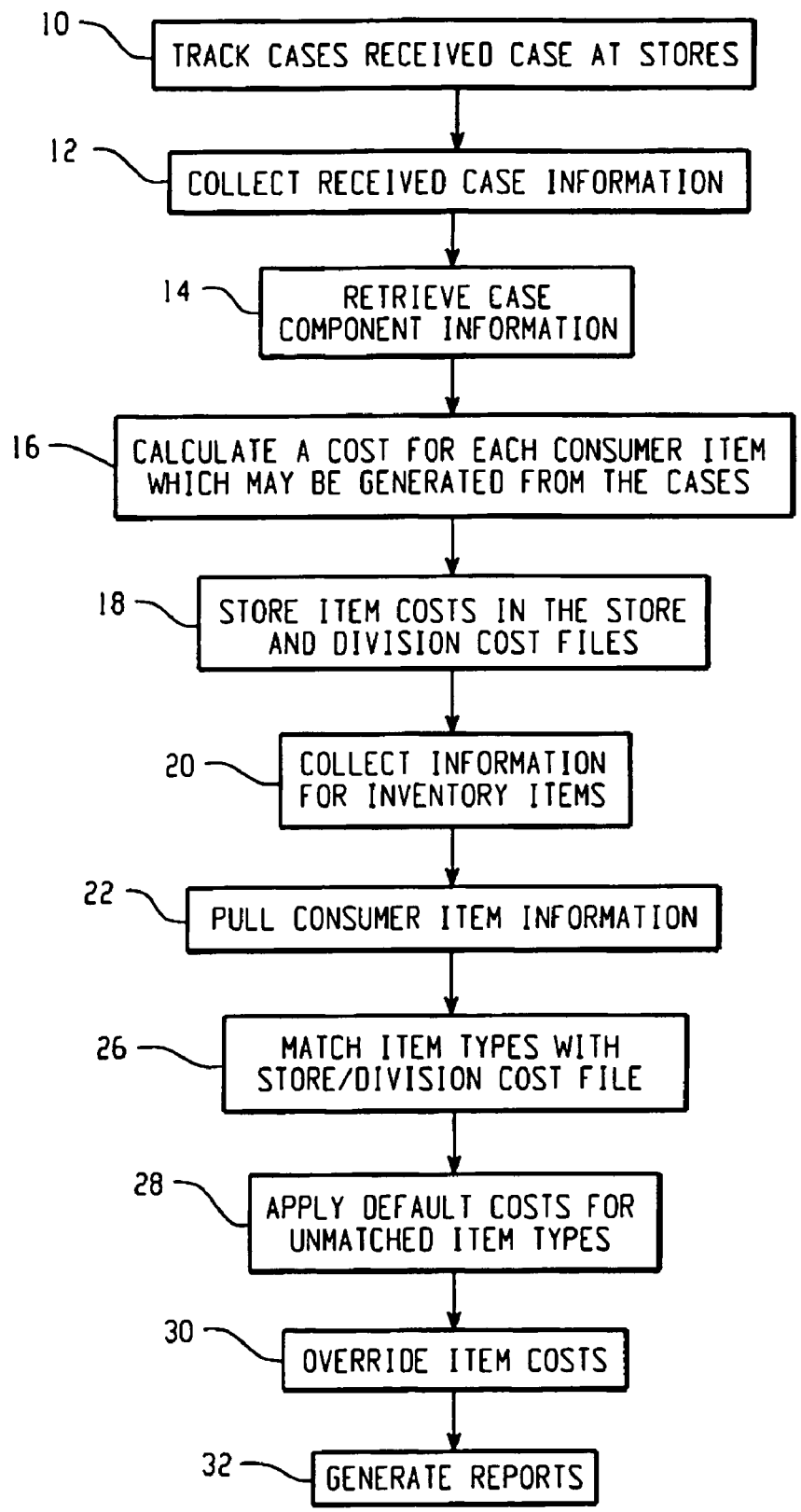
FIG. 1 is a flowchart illustrating a process of generating inventory reports.

For the purposes of describing an embodiment of the present invention, this description will discuss a large retail grocery enterprise. This embodiment is exemplary in nature and is in no way intended to limit the invention, its application, or uses and alternatively this invention can be used in most any retail, wholesale or service enterprise. Also, any patent or non-patent literature referenced herein and the disclosure contained therein is intended to be and is hereby incorporated by reference.

I. System and Method Overview

The system and method developed herein, enables evaluation of inventory of an enterprise. An enterprise comprises a number of stores that may be grouped by geographical or corporate characteristics, such as divisions. Divisions may be defined by geographical location, type of store, e.g. a convenience store or a superstore, or demographics, e.g. rural, urban or suburban. In addition, the demographic profiles of store customers may be used to group stores (e.g. a suburban middle class neighborhood or a suburban upper income neighborhood). As used herein, a store can be a retail outlet, wholesale outlet, restaurant, branch office or other physical location where transactions involving goods or services occur between the customer and the enterprise. Stores may be subdivided into smaller sections or departments to more effectively control and track their revenues and expenses. Examples of departments for a typical large retail store or what is generally called a superstore may include a men's clothing department, women's clothing department, toy department, consumer electronics department, grocery department, sporting goods department, automotive department, pharmacy department, furniture department, shoe department, alcoholic beverages department, house wares department, baby department and the like. Examples of departments within a typical grocery store can include the meat department, pharmacy department, grocery department, produce department, frozen foods department, bakery department and the like. Departments may be sub-divided into commodities to facilitate better control over the activities in the department. For example, the meat department may be subdivided into commodities such as hotdogs, bacon and the like. Commodities may be further divided into subcommodities. For example, beef franks are a subcommodity within the hotdog commodity. Subcommodities are collections of items. An item, as used herein, is a unit of sale of a good. Items may be delivered to store from warehouses or directly from vendors in cases. A case, as used herein, is a collection of items packaged for delivery to a store. For example, a case may be a side of beef, a crate of oranges, a tray of cookie dough or a cardboard box filled with items such as canned vegetables, boxes of cereal and the like.

The system provides the methodology and tools to calculate the cost for items in inventory. In some embodiments, the system may also be used to track gross profit on an item, subcommodity, commodity, department, store, division and enterprise basis. Gross profits are calculated by matching items sold out of the store, at the retail price paid, with the corresponding items delivered into the store, at the cost charged to the store. Details for tracking and costing sold items are described in U.S. patent application Ser. No. 11/047,451, titled "System and Method for Managing Financial Data," filed Jan. 31, 2005.

FIG. 1 illustrates a system for generating inventory reports for a store within an enterprise of supermarkets and/or grocery stores. At step 10, the system may collect information regarding the number, type and cost of each case received at a store within the enterprise. Information regarding the shipment of cases to the store may be collected including cases received from an enterprise-operated warehouse as well as cases delivered directly from vendors. At step 12, this shipment or delivery data may be periodically collected and transmitted to an enterprise data center for processing.

The system may include an item information database containing detailed information regarding virtually every type of item (e.g., both perishable foods, non-perishable foods and non-food items) which may be sold by any store in the enterprise. As used herein, a database is a collection of related data. In one embodiment, the item information database may be maintained at the enterprise data center. At step 14, the system may retrieve case composition information from the item information database for each type of case received at a store. Case composition information may include information regarding the number and types of items that may be produced using the contents of a particular type of case. Case composition information may also include a method or formula for calculating the cost of each item that may be produced from a case.

At step 16, the system may use the case composition information and the case cost to calculate a cost for each type of item which may be produced using the cases received by the store. The cost for each such item may be saved to a store cost file or database at step 18. The store cost file is a collection of item cost information for a particular store. The system may maintain a separate cost file for every store within the enterprise at the enterprise data center. In addition, the system may maintain a division cost file or database for each enterprise division including the item cost for every type of item received by any store within that division at the enterprise data center. The store cost file and division cost file may be implemented using an ordered sequential file or any other data storage method.

At step 20, the system collects information from data input devices, such as hand-held scanners, to identify the types of inventory items and the quantity of each type of item. This information may be collected at the stores and periodically transmitted to the enterprise data center for processing. At step 22, the system retrieves item information from the item information database, including a text description of the item name, department, commodity and the like for each type of item in inventory.

At step 26, the system attempts to retrieve the item cost for items identified in step 20 from either (or both) of the store cost file and the item cost file. In some embodiments, the system attempts to retrieve the item cost for perishable items from the store cost file and attempts to retrieve item costs for non-perishable items from the division cost file. As used herein, a food item is "perishable" when it is not heat-treated, not frozen, and not otherwise preserved in a manner so as to prevent the quality of the food from being adversely affected if held longer than a predetermined period of time, such as about 14 calendar days or less, such as about 7 calendar days, under normal shipping and storage conditions. Otherwise, the food item is non-perishable. If the system is unable to retrieve an item cost from the store or division cost file, the system will use a default cost. The system may invoke specific, sequential "default costing" logic to derive the applicable cost at step 28.

In some instances, the system attempts to retrieve the item cost for a particular type of, e.g., non-perishable item from the store cost file rather than from the division cost file. This may be the case, as an example, where a division spans a border, such as between two states. For example, certain commodities, such as tobacco products, may be taxed differently in different states of a division. In one state, tax may be passed to the consumer rather than be paid by the store while in the other state, tax may be paid by the store rather than be passed to the consumer. In this instance, it may be desirable to retrieve the item cost for the tobacco products from the store cost file, e.g., to account for the relatively constant cost variation between the stores of the two different states.

At step 30, the system may identify and override the item cost for item types with either extremely low or extremely high margins. Margin, as used herein, is a percentage equal to the difference between the total retail sales of a type of item and total cost for the item type, divided by the retail sales. For example, for an item type with a cost of $1 and a retail price of $1.50, the margin is equal to 33.3%. The system may override the item cost and substitute a derived or default-based cost for an item type with a margin outside of an expected range.

At step 32, the system may generate multiple inventory reports, for example, based upon the costs and numbers of the various items. The system may provide summary reports as well as exception reporting including reports calculating product shrink. Information from multiple stores may be combined to generate division-level reports or even enterprise-level reports. In addition, item information may be grouped by commodities to generate store, division or enterprise level commodity-specific reports.

The system may also be used to calculate cost of items sold. The system may be used to track gross profit on an item, subcommodity, commodity, department, store, division and enterprise basis.

II. Generate or Update the Store and Division Cost Files

In one embodiment, the system tracks the number, type and cost of cases delivered to each store. Each case type may be assigned a unique case code such as a Universal Product Code (case UPC). Each type of item is also assigned a unique item code, such as a consumer or retail UPC. In one embodiment, an enterprise includes a system of warehouses, where vendors deliver cases to the warehouses and the cases are distributed from warehouses to the stores. The warehouse may include an automated warehouse tracking system, such as the System ID Complete Turnkey Inventory Solution with Falcon available from System ID Warehouse of Plano, Texas, which includes handheld scanners and software designed to track the distribution of cases. Scanners are devices for sensing and reading encoded information, such as bar codes to identify items.

In an enterprise with a system of warehouses, a warehouse tracking system may record a cost for each case based upon vendor invoices. Typically, in retail markets, prices vary continually. Consequently, a warehouse may receive a first shipment of cases at one price and a second shipment of the same type of cases at a second, lower price. The warehouse tracking system may perform weighted averaging of the prices to determine the case cost to be charged to each store. For example, in a first shipment the warehouse may receive 100 cases of instant stuffing mix at a cost of fifty dollars for each case. At a later time, the warehouse may receive a discount and order an additional 50 cases of instant stuffing mix at a cost of forty dollars for each case. The weighted average cost charged to the stores can be calculated as follows:

$$(100*\$50.00+50*\$40.00)/150=\$46.67$$

In addition, certain cases may be shipped directly to the stores. For example, a store may receive cases of baked goods, fresh fish or other goods with a short shelf life directly from the vendor. Stores may also receive goods from directly from local, specialty vendors. In general, a store will receive an invoice indicating the case cost, case number and type of each case delivered to the store. Typically, this information is entered into the stores accounting system upon receipt of the cases via electronic direct exchange. The information may be manually entered into a store's accounting system. In one embodiment, the information regarding the delivery of cases to a store, whether from a warehouse or directly from a vendor, is collected and processed periodically. For example, the system may collect case information on a weekly basis.

After collecting information regarding the types of cases delivered to a store within a given period of time, the system may retrieve case composition information for each type of case received. The system may include an item information database containing information regarding the number and type of each item that may be produced using the contents of each type of case. The system may use the case composition information and the cost per case to calculate a cost for each type of item capable of being produced using the contents of a case delivered to the store.

The system may include many different categories of cases. Each category may have a different method for calculating item cost for the types of items associated with the case type. In one embodiment, the system includes six categories of cases: fixed size single component, fixed size multiple component, variable sized single component, divisible, cutdown and built-up cases.

A. Fixed Size Single Component Cases

Fixed size single component cases contain a fixed number of a single type of item. For example, one case of Brand X instant stuffing mix contains 100-8 oz. boxes of Brand X instant stuffing. Each case of that case type will contain exactly 100-8 oz. boxes of that single type of item, an 8 oz. box of Brand X instant stuffing. Accordingly, the case composition information for this case type will include the consumer UPC for an 8 oz. box of Brand X instant stuffing and the number of items contained within the case (i.e. 100). To calculate the item cost for a single 8 oz. box of Brand X instant stuffing, the system simply divides the cost of the case by the number of items within the case. If the case cost is equal to $50.00 dollars, the cost per item will be equal to $50.00 divided by 100, or 0.50 dollars.

If the vendor of Brand X instant stuffing also sells the instant stuffing in a case of fifty 8 oz. boxes of Brand X instant stuffing, the fifty count case may be considered a separate case type. The fifty count case may be given a separate case UPC, which may be used to retrieve separate case composition information. The system may perform a separate calculation of item cost for boxes of instant stuffing based upon the fifty count case. The system may use a weighted average of the item cost from the one hundred count case and the fifty count case as described in further detail in the discussion of fixed size multiple component cases.

B. Fixed Size Multiple Component Cases

Fixed size multiple component cases include fixed numbers of multiple types of items. One example of a multiple component case is a module. A module, as used herein, is a case that converts into a self-contained, freestanding display unit. One type of module may include items associated with a holiday meal, such as Thanksgiving dinner. The Thanksgiving dinner module may contain twenty boxes of instant stuffing, ten jars of turkey gravy and 10 pie shells. Accordingly, case composition information for the Thanksgiving module case type may include the consumer UPCs for instant stuffing, turkey gravy and pie shell items as well as the number of each type of item contained in the case. The case composition information may also include information regarding the division of the case cost among the different types of items contained within the case. For example, instant stuffing items may constitute 20% of the case cost, gravy items may constitute 40% of the case cost and pie shell items may constitute the final 40% of the case cost. To calculate an item cost for a type of item, the system may multiply the total cost of the case by the cost percentage for that item type and divide by the number of items of that type of item contained in the case. In the Thanksgiving module example, if the case cost is sixty dollars and instant stuffing constitutes 20% of the case cost, the cost of twenty boxes of instant stuffing is equal 20% of $60.00, i.e. $12.00. Therefore, the cost of a single item of instant stuffing is equal to $12.00 divided by 20 boxes, i.e. $0.60.

As shown in the examples illustrating single component case types and multiple component case types, a single item type may have more than one associated item cost depending upon the case type in which it is shipped. A box of instant stuffing from the Thanksgiving module may have a cost of $0.60, while the box of instant stuffing from the case containing only instant stuffing may have an associated cost of $0.50. In one embodiment, the system calculates a weighted average of the different costs associated with the item type. In the examples discussed above the store has received 100 boxes at an item cost of $0.50 each and twenty boxes at an item cost of $0.60 each. To calculate the weighted average the system multiplies each item cost by the number of items received at that item cost. These costs are added together and divided by the total number of items received:

$$(100 \times \$0.50) + (20 \times \$0.60) = \$50.00 + \$12.00 = \$62.00 / 120 = \$0.52 \text{ per item}$$

C. Variably Sized Single Component Cases

Variably sized single component cases contain a single component that can be divided into a number of variably sized items of the same item type. For example, a block of cheese sold by the deli may be divided into multiple pieces of cheese of varying weights, each of which will have the same consumer UPC. For variably sized single component cases, retail price and item cost are based upon both size of the item and item type. For this category of case, the case composition information may include an average case size.

The system may also provide for the loss of a portion of the item during processing. For example, during slicing, a portion of the cheese may be lost to the culinary equivalent to sawdust. To determine a standard percentage of loss, multiple blocks of cheese may be weighed, sliced and reweighed to determine the average amount of cheese lost during slicing. In one embodiment, the case composition information includes a loss percentage.

To determine the cost per unit for a variably sized item, the system may subtract the predicted loss from the case size and divide the case cost by the remaining units. For example, if a block of cheese has a weight of 20 pounds, a cost of $30 and a predicted percentage loss of 1.5%, the predicted loss of cheese is equal to 1.5% of 20 pounds or 0.3 pounds of cheese. Accordingly, the store will expect to be able to sell 19.7 pounds of the cheese out of the 20-pound block. The cost for the cheese is equal to 30 dollars for 19.7 pounds, or $1.52/lb. Although the example used herein describes items of variable weight, items may be measured and sold by other units. For example, fabric may be sold by the yard.

D. Divisible Cases

A divisible case contains multiple components that may be divided into groups to create several different types of items. A tray containing 120 balls of cookie dough is an example of a divisible case. Once the case is delivered to the store, the dough may be baked to produce cookies. The store may have the discretion to sell the cookies individually or in packages of 4, 12 or 20. Each package size may be considered a separate type of item. Therefore, the case is capable of producing multiple combinations of items and item types. For example, the store may choose to produce 20 individual cookies, 5 packages of 4 cookies, 5 packages of 12 cookies and one package of 20 cookies from the case, or any other combination of the 120 cookies.

In one embodiment, the case composition information includes the total number of components in the case and a unit factor equal to the number of components necessary to produce one item of each item type. For example, the individual cookie would have a unit factor equal to 1, the package of 4 cookies would have a unit factor of 4, the package of 12 cookies would have a unit factor of 12 and so on. To calculate the item cost for a type of item, the system divides the cost of the case by the number of components within the case to determine the unit cost. Then the unit cost is multiplied by the unit factor for the type of item. The system may calculate a cost for each type of item that is capable of being produced from that type of case. For example, for a cookie tray case with a cost of $20, the system will calculate a cost for individual cookies and packages of 4, 12 or 20 cookies. In this example, the unit cost is equal to $20 divided by 120 cookies or $0.17. Therefore, a single cookie would have a cost of $0.17, a package of 4 would have a cost of $0.67, a package of 12 would have a cost of $2 and a package of 20 would have a cost of $3.33.

E. Cut-down Cases

A cut-down case contains a single component that may be divided into a number of variably sized items of various item types. For example, a cut-down case may consist of a side of beef. A butcher at the store may cut the side of beef to produce a number of different types of cuts of meat (e.g. tenderloin, roast, sirloin, hamburger and the like). The cost of the case is based upon the weight of the side of beef. The items produced from a side of beef will vary in size from depending upon the size of the side of beef and the choices and cuts made by the butcher. The system calculates a cost per pound for each item type produced from the case. FIG. 2 shows an example of a screenshot showing a cut-down case example.

Testing may be performed to predict the percentage yield of each type of item from the primal side of beef. In one embodiment, a number of sides of beefs may be cut by several different butchers. The results of these multiple cuts are analyzed to determine the average percentage of each type of item produced from the side of beef as well as the average percentage of loss during each cut-down. These percentages may be included in the case composition information along with an average weight for a side of beef, and used, e.g., for inventory tracking.

To determine the cost per pound for each item type, the system may first subtract the expected loss from the average weight of a case to calculate the expected saleable pounds of meat. The total cost of the case may be divided by this expected saleable pounds to determine the cost per pound. All item types cut from a single side of beef will have the same cost per pound. As discussed above with respect to variably sized single component cases, although the example used herein describes items of variable weights, items may be measured and sold by other units.

F. Built-up Cases

Built-up cases contain components that may be combined with the contents of other case types to create items. For example, a store may sell deli sandwiches. A sandwich may include ⅛ lb. of roast beef, 1/32 lb. of Swiss cheese, a tablespoon of mustard and the like. Typically, the store will receive the ingredients of the sandwich in several different types of cases. For example, a case of mustard may contain two very large containers of mustard at a case cost of $10. The case composition information for the case of mustard may include the number of tablespoons of mustard within each container of mustard (e.g. 150). Therefore, the cost of each tablespoon of mustard is equal to the cost of the case divided by the number of tablespoons of mustard within the case. In this example, the cost of a tablespoon of mustard would be $10.00/(150*2), or $0.03. In one embodiment, the system may maintain recipe lists for each type of built-up item. The system may calculate and record the cost for each ingredient of every built-up item.

In another embodiment, the system may utilize default costs for certain types of items, such as built-up items. In certain instances, system operators may determine that it is not cost effective to track each item ingredient, and may elect to use default costs for certain item types, such as deli sandwiches.

Once the system has determined a cost for the item types that may be produced from the cases delivered to the store during the given period of time these costs may be saved to a store cost file and/or a division cost file. In one embodiment, the division cost file contains the cost for the last four deliveries of an item. The system may purge item costs from the division cost file after a certain period of time, for example, two years, to prevent use of an out of date cost per item. In addition, the system may also maintain a store level cost file. The store level cost file is a cumulative record for all of the stores within a division. In some embodiments, the store and/or division cost file contains the weighted average cost over one or more occurrences, such as over four weeks (e.g., for non-perishable food items) and/or over one week (e.g., for perishable food items). The store and division cost files may each be implemented as a single file, a collection of files, a database or any other data storage option.

III. Tracking Inventory and Associating an Item Cost with an Item

Once the store and division cost files have been updated, the system may process inventory information, including each type of item in inventory and the number of each type of item in inventory. Number and type of items in current inventory can be determined, for example, by tracking the number and type of items sold and subtracting the numbers of items sold (and known loss items) from the number of items received and/or by taking a physical inventory of items at the retail location.

Figure 3:
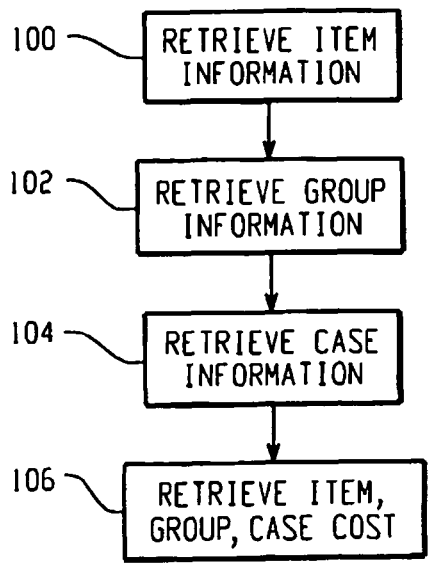
FIG. 3 is a flowchart illustrating a process for retrieving cost information for an item, group or case.

Referring to FIG. 3, a method 100 of retrieving item information for items in inventory includes retrieving item information, for example, using a scanner. Typically, each item located on display has a consumer UPC contained in a bar code located on the item and the item information can be collected at step from the consumer UPC. In some embodiments, bar code scanners, e.g., hand-held scanners are used to retrieve the item information from the bar code. An example of a suitable hand-held scanner is commercially available from Symbol Technologies, Inc., of Bentonville, Ark.

In some embodiments, the system maintains multiple consumer UPCs for each item, including a scanned UPC, a base UPC and a group UPC. As used herein, the scanned UPC is the UPC retrieved from the bar code located on an item. The base UPC is an additional consumer UPC utilized when the system is unable to obtain a UPC from the bar code for the item or when the information for a collection of item types is stored using a single UPC. The group UPC is used when the item type is a component of a second item type, and cost information is maintained under the second consumer UPC, as discussed in greater detail below.

While the system may simply use the scanned UPC for most items, not all items may be scanned either at its location in the store or at the point of sale. Certain items such as bags of ice may be too heavy to lift, other items, such as produce, may not have a bar code. In such situations, a product look up code ("PLU") may be entered, e.g., using a keypad. This PLU may be used to retrieve the same information as a scanned UPC. The system will treat the PLU as the scanned UPC and generate a base UPC for the item.

In one embodiment, certain item types may be closely related. In such situations, it may be preferable to store the information for only one of the item types in the item information database. For example, a certain brand of paper towels may come in multiple patterns, such as checked, pink floral, green floral and the like. Each pattern will have a different scanned UPC. However, for the purposes of the system the same information is associated with each scanned UPC. Therefore, the system may use a base UPC associated with each of the scanned UPCs. In one embodiment, sales information generated by the POS system will include a scanned UPC and an associated base UPC, if applicable.

In one embodiment, certain items may include a group UPC which may be scanned at step 102 to collect group information. A group UPC indicates that the item type is a component of another item type. For example, cigarettes may be sold by either the carton or the pack. To sell cigarettes by the pack store personnel simply open a carton of cigarettes. Both the pack and the carton have a bar code with a unique scanned UPC. The system may maintain an item cost for cartons of cigarettes, but not for individual packs. To calculate a cost for a pack of cigarettes, the system divides the cost of the carton by the number of packs contained in a carton. Therefore, a pack of cigarettes would have a scanned UPC read from the bar code located on the package and a group UPC equal to the scanned UPC for a carton of cigarettes.

Inventory may also include cases of items. In these instances, the case UPC including the case information can be scanned or scanning the order sheet for that case at step 104 in lieu of opening the case and scanning each individual consumer UPC. Where only a portion of items in a case have been removed from a case, the items removed can be individually scanned and the system can determine that those items have been removed, for example, from that case or from one or more of a number of cases received that include those item types or type. In some embodiments, either the case UPC may be scanned and counted in whole or partial amounts (e.g., 0.6 of a case), or the items within the partial case may be removed therefrom and scanned individually.

In some embodiments including, for example, built-up case inventory and product produced from built-up case components, inventory may be tracked using recipe files. For example, a recipe file may be retrieved by scanning an consumer UPC associated with a deli sandwich. The recipe file for the deli sandwich may indicate that ⅛ lb. of roast beef, 1/32 lb. of Swiss cheese, a tablespoon of mustard, etc. are used to produce the deli sandwich, as an example. This information can be used to track the components used to form the deli sandwich, such as pounds of mustard, pounds of Swiss cheese and pounds of roast beef in inventory. Each recipe can have one or more alternative selections for each type of ingredient. For example, different brands of roast beef or Swiss cheese can be listed in the recipe. Preferred selections can be made on, for example, a division bases. The system may then search for the preferred items at each store to determine the cost of the built-up item.

For cut-down cases, empirical data may be used in tracking inventory. As one example, empirical data based on weight of a side of beef can be used to determine number of cuts and associated pounds expected, average percentage loss expected, etc. for a number of sides of beef having associated weights. During inventory, a consumer UPC associated with a particular cut of meat can be scanned and the item information can be used to track inventory of that type of cut (and/or the weight of the sides of beef) with reference to the expected numbers of cuts. As noted above, all item types cut from a side of beef can have the same cost per pound. Thus, it may be desirable to use the empirical data to track weight of beef in inventory for inventory costing purposes. In some instances, if the item has not been cut and trimmed of loss, then the item may be inventoried by the case UPC with no loss calculated. If the item has been cut and processed, then the cuts may be inventoried by consumer UPC, which may factor in loss for purposes of determining cost.

Once the system has collected the scanned information containing the scanned, base, group and case UPCs for each item type, where applicable, the system retrieves additional information at step regarding each type of item from the item information database. This information may include a text description of the item, department and commodity information, the case UPC and the like.

After the system collects the scanned information and retrieves item type information from the item information database, the system may retrieve an item, group and/or case cost depending on the type(s) of item at step 106. In a first embodiment, the store and division cost files are implemented as databases and item, group and/or case cost for items, groups and/or cases are retrieved using database queries. However, for a large retail enterprise selling a large variety of types of items this could require millions of database queries. In an alternate embodiment, the store cost file and division cost file may be implemented as ordered, sequential files. In an ordered, sequential file all of the records are organized serially, one after another, and may be organized or ordered using a key field, such as consumer UPC. To access records in a sequential file, the system must access the first record and read all the succeeding records until the required record is found or until the end of the file is reached. In one embodiment, the system will generate list of scanned, base and group UPCs and match those lists to the ordered, sequential store and division cost files to retrieve item cost.

Figure 4:
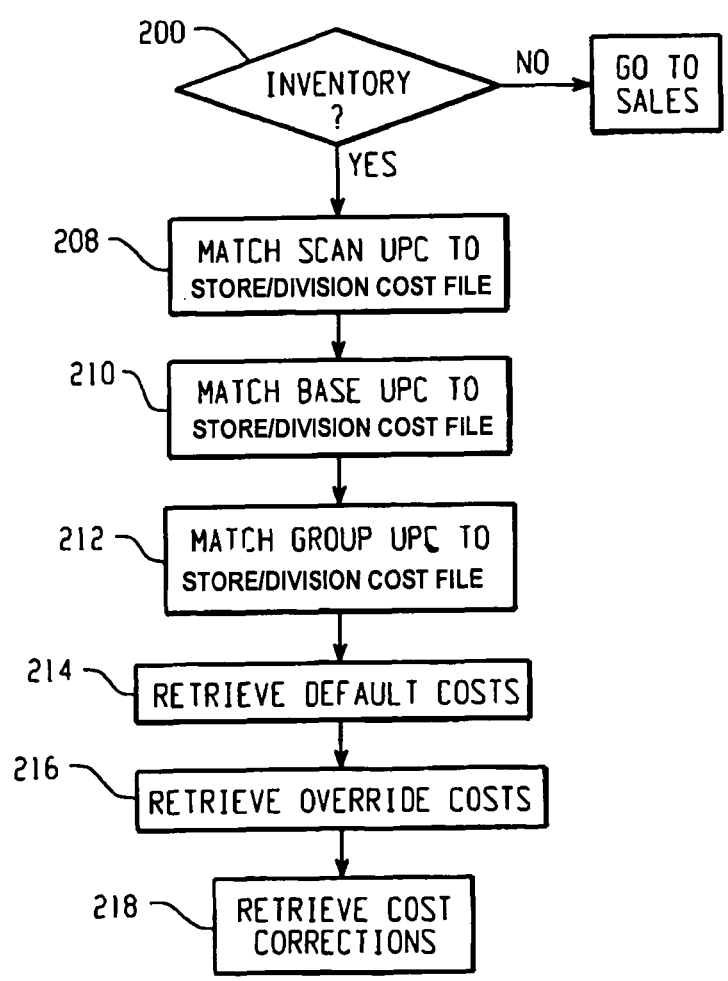
FIG. 4 is a flowchart illustrating a process for assigning a cost to an item type.

In an embodiment illustrated in FIG. 4, the system locates or generates an item cost for each type of item. At step 200, the system asks whether cost for inventory or sale is desired. Where cost of an inventory item is being located or generated, the system accesses the store cost file for perishable items and the division cost file for non-perishable items and attempts to match the scanned UPC of each of the types of items in inventory with a consumer UPC and item cost in the store or division cost file at step 208. At step 210, the system accesses the store or division cost file again and attempts to match the base UPC of each of the types items in inventory with a consumer UPC and item cost in the store or division cost file. Next, at step 212, the system accesses the store or division cost file a third time, attempting to match the group UPC of each type of item sold with a consumer UPC and item cost from the store or division cost file. If the system finds more than one match during the three passes through the store or division cost file, the system may use the item cost that has been updated most recently. In some embodiments, for perishable food items, the system may also access the division cost file as described above if the item cost is not identified using the store cost file.

After retrieving item costs from the store and division cost files, the inventory information retrieved may still include certain types of items without an associated cost. For example, a deli sandwich prepared in the store and in inventory may not have an item cost in either the store or division cost files. The system may include a set of default costs to provide for such items. At step 214, the system may retrieve a default cost for any item type without an associated item cost.

Figure 5:
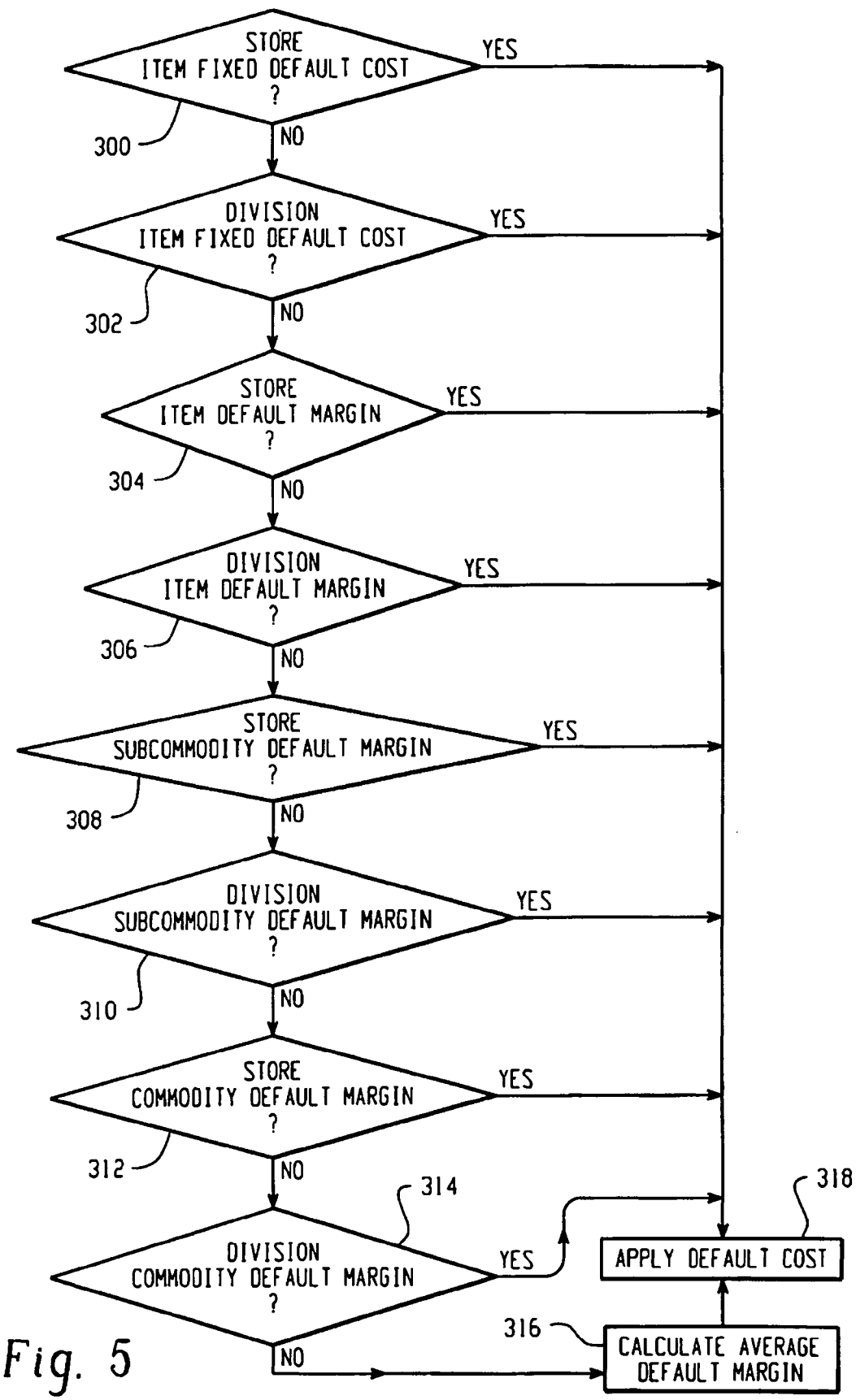
FIG. 5 is a flowchart illustrating a default costing process.

In one embodiment, the system includes a series of default cost rules used to determine item cost, as illustrated in FIG. 5. Each store and division may have a separate set of default costs for certain item types. At step 300, the system attempts to retrieve a store specific fixed default item cost for the scanned, base or group UPC of the item type from the default database. As used herein, a fixed default cost is a predetermined dollar amount. If the default database includes a store level fixed default cost for the item, the default cost is applied at step 318. If the system is unable to retrieve a store level fixed default cost, the system attempts to retrieve a division level fixed default cost for the scanned, base or group UPC for the item type at step 302. If the default database includes a division level fixed default cost for the item, the default cost is applied at step 318. In some embodiments, only the store cost file may be searched, for example, for built-up items produced by the store.

If the system is unable to retrieve a fixed default cost for the scanned, base or group UPC associated with the item type, the system will check the default database for a store level default margin for the consumer UPCs at step 304. As used herein, a default margin is a percentage of the retail price. For example, if the item has a retail price of $10.00 and the default margin is 55%, the item cost is equal to the retail price multiplied by one minus the default margin, i.e. $10.00*45% or $4.50. If the retail price of the item type is reduced to $8.00, the default cost will be equal to 45% of $8.00, i.e. $3.60. If a store level default margin is found, a cost will be calculated using default margin, otherwise the system will check for a division level default margin at step 306.

If the system is unable to retrieve a default margin for the item type at the store or division level, the system will attempt to retrieve a store level default margin for the subcommodity to which the item type belongs at step 308. If the system is unable to retrieve a store level default margin for the subcommodity, at step 310 the system will search the default database for a division level default margin for the subcommodity.

If the system is unable to locate a default margin for the subcommodity of the item type, the system will search the default database for a store level default margin for the commodity to which the item type belongs at step 312. If the system is unable to retrieve a store level default margin for the commodity, at step 314, the system will search the default database for a division level default margin for the commodity.

At step 316, if the system has been unable to retrieve a default cost or margin for the item type, the system may calculate a default cost based upon other item types within the same department. In one embodiment, the system calculates an average cost margin for all item types within the same department for which it was able to retrieve an item cost from the store or division cost files. This average is used as the default margin for the item type.

After default processing, every item type should have an associated item cost. At step 216 of FIG. 4, the system may provide a means to override the cost of one or more item types. Each division or store may establish override margin ranges that represent the current margin trends for each commodity or item type and identify item types with extremely high or low margins. For example, the override margin range for a 20 oz. bottle of soda may be from 90% to negative 200%. In this example, the system will determine whether that item type, a 20 oz. bottle of soda, yields an actual margin greater than 90% or less than negative 200%. If the margin is outside of the override margin range, the system will apply an override margin to calculate an override cost. The use of override costs prevents errors and leads to more realistic costing. For example, single 20 oz. bottles of soda frequently show a margin of more than negative 200% because the scanner at the point of sale may register the consumer UPC for a six-pack of 20 oz. bottles rather than an individual bottle. Consequently, the system retrieves the item cost for a six-pack of 20 oz. bottles. Properly set cost override margins may correct for this error and assign a more realistic margin of 10%. The system may base override margins upon average commodity margins. Although, in the preceding example margin was used to determine when to override the item cost, other measurements might be used, such as item cost and the like.

In one embodiment, at step 218 the system provides a means for correcting an item cost. If the system operator becomes aware that there is an error in item cost, but the cost margin for the item type remains within the override margin range, the system operators may replace the item cost with a corrected item cost.

IV. Report Generation

The system may utilize the cost information to generate a variety of inventory reports allowing store, division and enterprise level management to monitor and manage costs associated with inventory items, commodities within departments, stores and divisions. In one embodiment, the system may generate an item detail inventory report. The item detail inventory report lists, in detail, items counted in a store's inventory. The detail information can be divided, for example, into categories such as department and commodity. Additional departments such as nutrition and meat may also be included in the report for price integrity audits.

The system may also produce exception-based reports. Exception based reports are triggered by events or values which fall outside of a normal range. For example, the system may generate a negative margin report listing all items sold by a store at a negative margin. This report may highlight potential problems, however, a store may choose to set a retail price below item cost for certain items for competitive reasons.

The system may generate additional reports such as slow-moving item, overridden cost, zero cost or high-low margin percentage reports. A slow-moving item report indicates those items in inventory during a given time period and where the item type has not been delivered to the store for a significant period of time, such as six months. An overridden cost report may list all instances where a cost override margin was applied. A zero cost report may include those item types that do not have an item cost in either the store cost file or the division cost file. A high-low margin percentage report may include item types with unusually high or low cost margins, where the margins did not exceed the thresholds required for the override cost margin. For example, the system may include a warning range for cost margins of 0% to 60%. If the cost margin for an item type is outside of this range, the item type may be listed on the high-low margin percentage report, but would not trigger a cost override by the system. One skilled in the art will appreciate that many different reports may be created using the financial data generated by the system.

V. System Architecture

Figure 6:
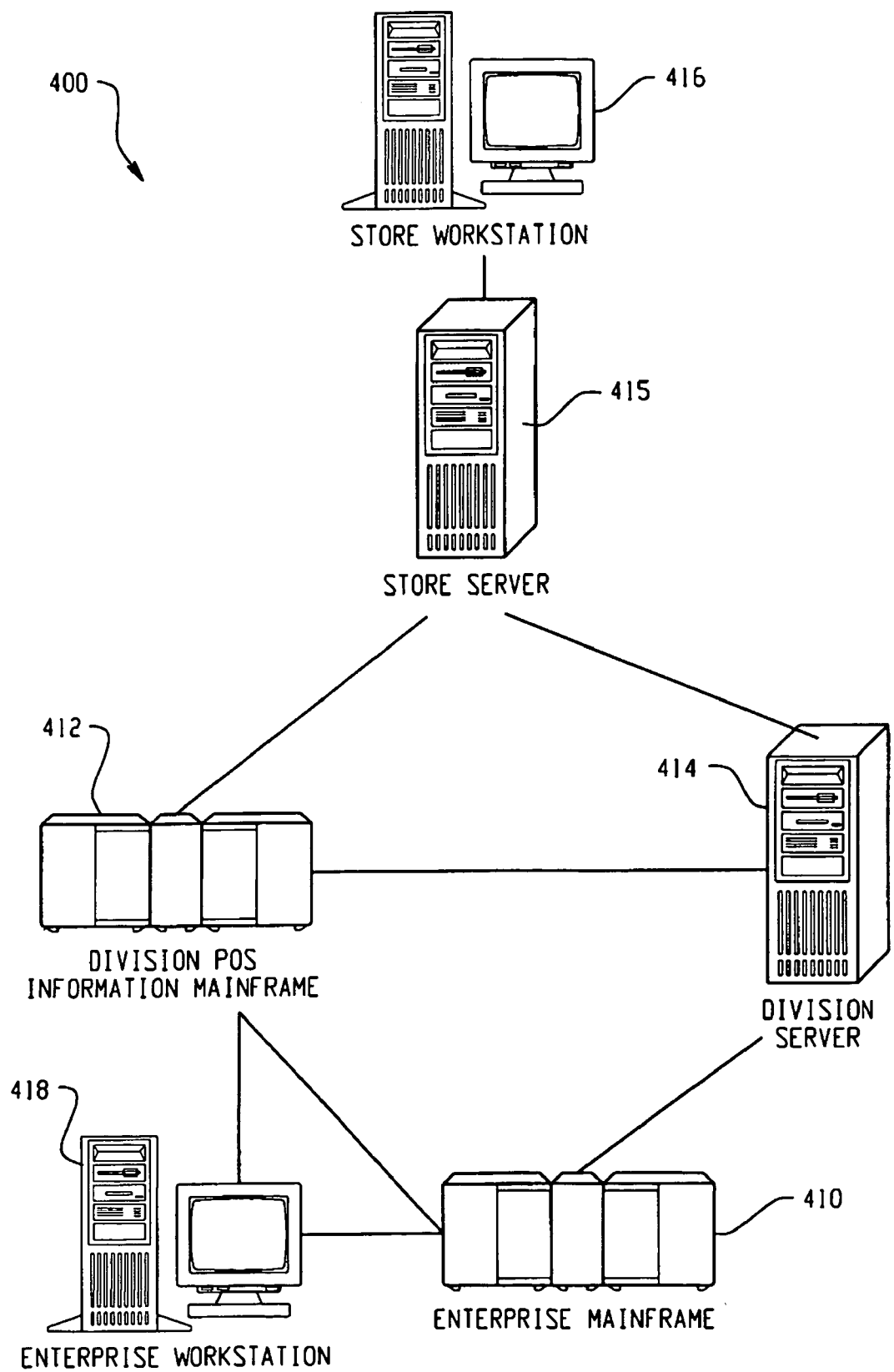
FIG. 6 is an illustration of an embodiment of the system architecture.

FIG. 6 illustrates one embodiment of a system architecture for the financial data management system 400. The lines depicted in FIG. 6 connecting the elements of the system 400 indicate communication paths rather than physical connections between the elements. The system may include an enterprise mainframe 410. Case delivery information, the item information database, the store cost file and the division cost file may be maintained on the central mainframe 410. The item information database may be implemented as a relational database, such as DB2 Universal Database V8.1 commercially available from IBM.

A division POS information mainframe 412 may be used to maintain the sales information received from POS systems maintained at the stores. The division POS information mainframe 412 may be partitioned, such that each division of the enterprise utilizes a separate portion of the division POS information mainframe 412. The enterprise mainframe 410 and division POS information mainframe 412 may be implemented using the eServer zSeries 900, commercially available from IBM.

The system 400 may include one or more division servers 414. Each division of the enterprise may have a separate division server 414 in communication with one or more store servers 415. The division server 414 and store server 415 may be implemented using an eServer series 570, available from IBM. Store servers may be connected to one or more store workstations 416 for the store.

The store workstation may be implemented using a personal computer having suitable input/output devices, such as a mouse or keyboard, processors, memory and communications interfaces. For example, the workstation 416 could be implemented using the ThinkCentre™ A30, commercially available from IBM. Workstation 416, as used herein, may also include digital assistants and other devices permitting connection to and navigation of the network.

The system 400 may include one or more enterprise workstations 418. System administrators may utilize the enterprise workstation 418 to maintain and update the central mainframe 410 and the division POS information mainframe 412. The central mainframe 410, division POS information mainframe 412, division server 414, store server 415, enterprise workstation 418 and store workstation 416 may be connected to a wide area network (WAN), such as an intranet, the Internet, an extranet or any other communications network. The system is sufficiently flexible in its design to permit implementation in various computer systems and networks and is not limited to the system architecture described above.

While particular embodiments of the present invention have been illustrated and described, it would be obvious to those skilled in the art that various additional changes and modifications can be made without departing from the spirit and scope of the present invention. While the items, commodities, departments and the like have been shown illustrative of a grocery store, these principles may be applied to stores, factories, service industries and warehouses of various types. It is therefore intended to cover in the appended claims all such changes and modifications that are within the scope of this invention.

What is claimed:

1. A computer assisted method for evaluating inventory, comprising:

receiving case composition information and case cost information for a cut down case at a store where the case composition information identifies a plurality of items of varying types, where a single component of the case is capable of being divided to create the plurality of items of varying types, and the case cost information identifies cost of the case;

calculating an item cost for each of the items using the case composition information and case cost information, the calculating performed by a computer system storing the item cost for each of the items in memory of the computer system;

receiving consumer code information for a given item of the plurality of items, the consumer code also used to identify the given item during sale of the given item;

retrieving the item cost of the given item of the plurality of items; and generating inventory cost data using the item cost, the generating performed by the computer system.

2. The method of claim 1, wherein the calculating includes calculating an average item cost for at least one item for a pre-selected time period.

3. The method of claim 2, wherein the pre-selected time period is about one week or about four weeks.

4. The method of claim 2 further including the step of storing the average item cost in a store cost database.

5. The method of claim 4, wherein the store cost database is an ordered, sequential file.

6. The method of claim 1, wherein the case composition information is received from an item information database of the computer system.

7. The method of claim 1, wherein the item is a perishable food item.

8. The method of claim 7 further comprising separating the perishable food item from the case prior to the step of receiving consumer code information for the item.

9. The method of claim 7 further comprising scanning a barcode associated with the perishable food item.

10. The method of claim 1 further comprising:
receiving consumer code information for multiple items;
calculating an item cost for the multiple items; and
generating inventory cost data using the item costs.

11. The method of claim 1, wherein the identified item is in inventory of the store.

12. The method of claim 1 further comprising receiving case code information where the case code information is a universal product code.

13. The method of claim 1, further including replacing the item cost with an override item cost.

14. The method of claim 1 further including replacing the item cost with a corrected item cost, where the corrected item cost is determined by an operator.

15. A method for evaluating inventory, comprising:
receiving a cut down case at a store, where the cut down case includes a component capable of being divided to produce a plurality of items of varying types;
receiving case code information identifying the nature of component in the cut down case and case cost information;
retrieving case composition information for the received cut down case from a database of a computer system using the case code information, where the case composition information identifies the items of varying types capable of being produced using the component of the cut down case;
calculating an item cost for each of the plurality of items, wherein the step of calculating uses the case composition information and the case cost information associated with the cut down case the step of calculating performed by the computer system;
storing the item cost for each of the plurality of the items in a cost database of the computer system;
receiving item code information for a given item of the plurality of items, the item code information also used to identify the given item during sale of the given item;
retrieving the item cost of the given item from the cost database;
associating the item cost with the given item; and
generating an inventory report using the associated item cost, the generating performed by the computer system.

16. The method of claim 15 further including the step of storing the item cost in a store cost database.

17. The method of claim 16, wherein the store cost database is an ordered, sequential file.

18. The method of claim 15, wherein the case composition information is received from an item information database of the computer system.

19. The method of claim 15, wherein the item is a perishable item.

20. A computer assisted method for evaluating inventory, comprising:
a programmed computer system carries out the steps of:
receiving case composition information and case cost information for multiple cases where the case composition information of each case identifies items of the case and the case cost information of each case identifies cost of the case;
calculating an item cost for each of the items using the case composition information and case cost information;
computing a weighted average item cost for each of the items, where at least one item type is present in both a single component case and a multiple component case, and cost for the at least one item type varies as between the single component case and the multiple component case;
storing the weighted average item costs in a store cost file and/or a division cost file;
performing an inventory analysis for a store, including:
receiving consumer code information for a plurality of items, the consumer codes also used to identify the items during sale of the items;
retrieving weighted average item cost of a multiplicity of the plurality of items from the store cost file and/or division cost file;
identifying one or more items of the plurality of items for which no weighted average item cost was available in the store cost file and/or division cost file and applying a set of default costs for such items; and
generating inventory cost data using the computer and the weighted average item costs for the plurality of items.

21. The method of claim 20 wherein the applying the set of default costs involves:
identifying whether a given item has an associated store default cost or division default cost and, if so, applying such default cost;
if no store default cost or division default cost is identified, identifying whether the given item has an associated store default margin or division default margin and, if so, calculating cost of the given item using the associated default margin.

22. The method of claim 20 wherein the programmed computer system is an enterprise mainframe computer system connected to communicate with multiple different store computers.

* * * * *